(No Model.) 2 Sheets—Sheet 1.
B. G. OLSON.
HAY SLING.
No. 505,227. Patented Sept. 19, 1893.
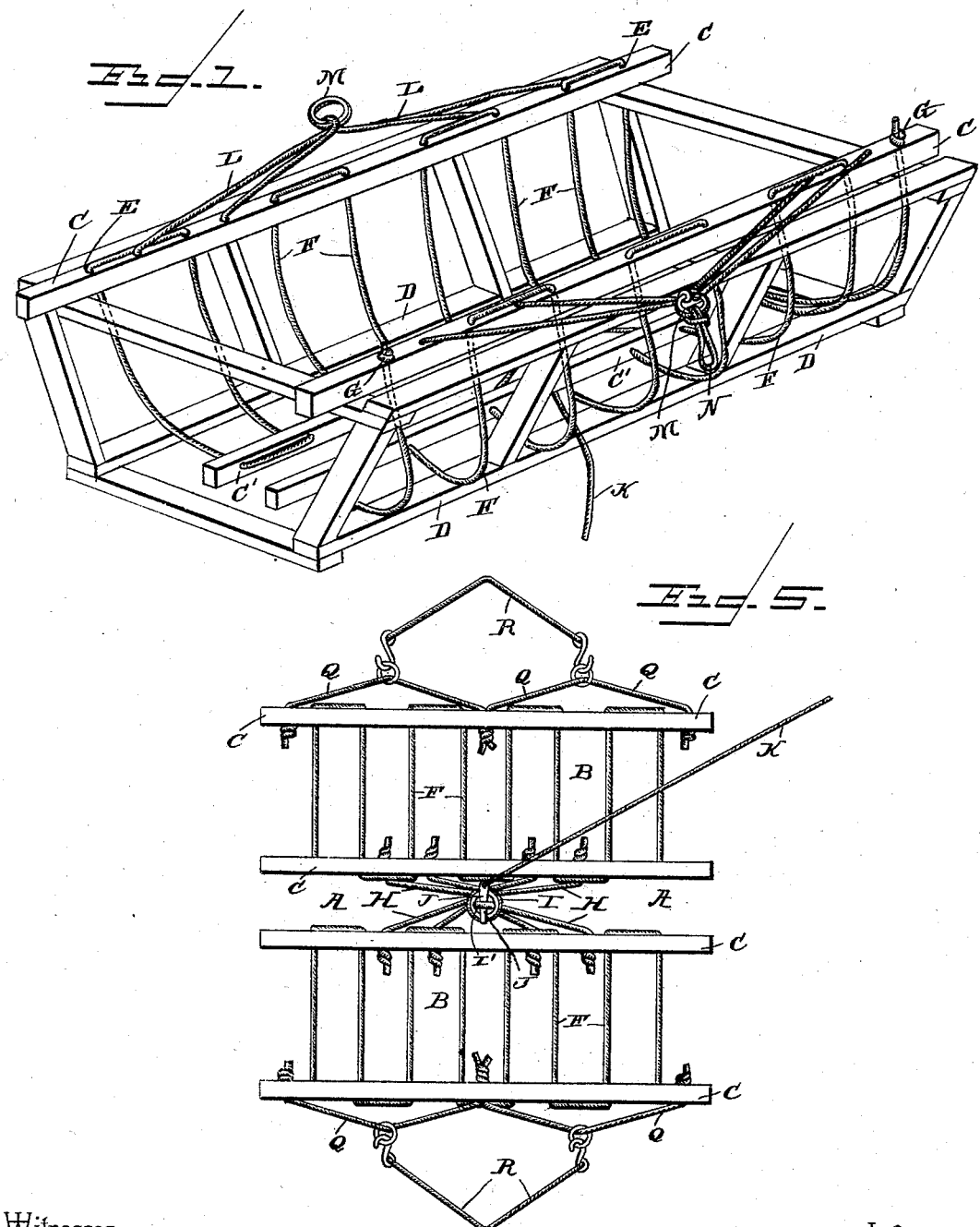
Witnesses
E. K. Stewart
D. P. Wolhaupter
Inventor
B. G. Olson,
By his Attorneys,
C. A. Snow & Co.

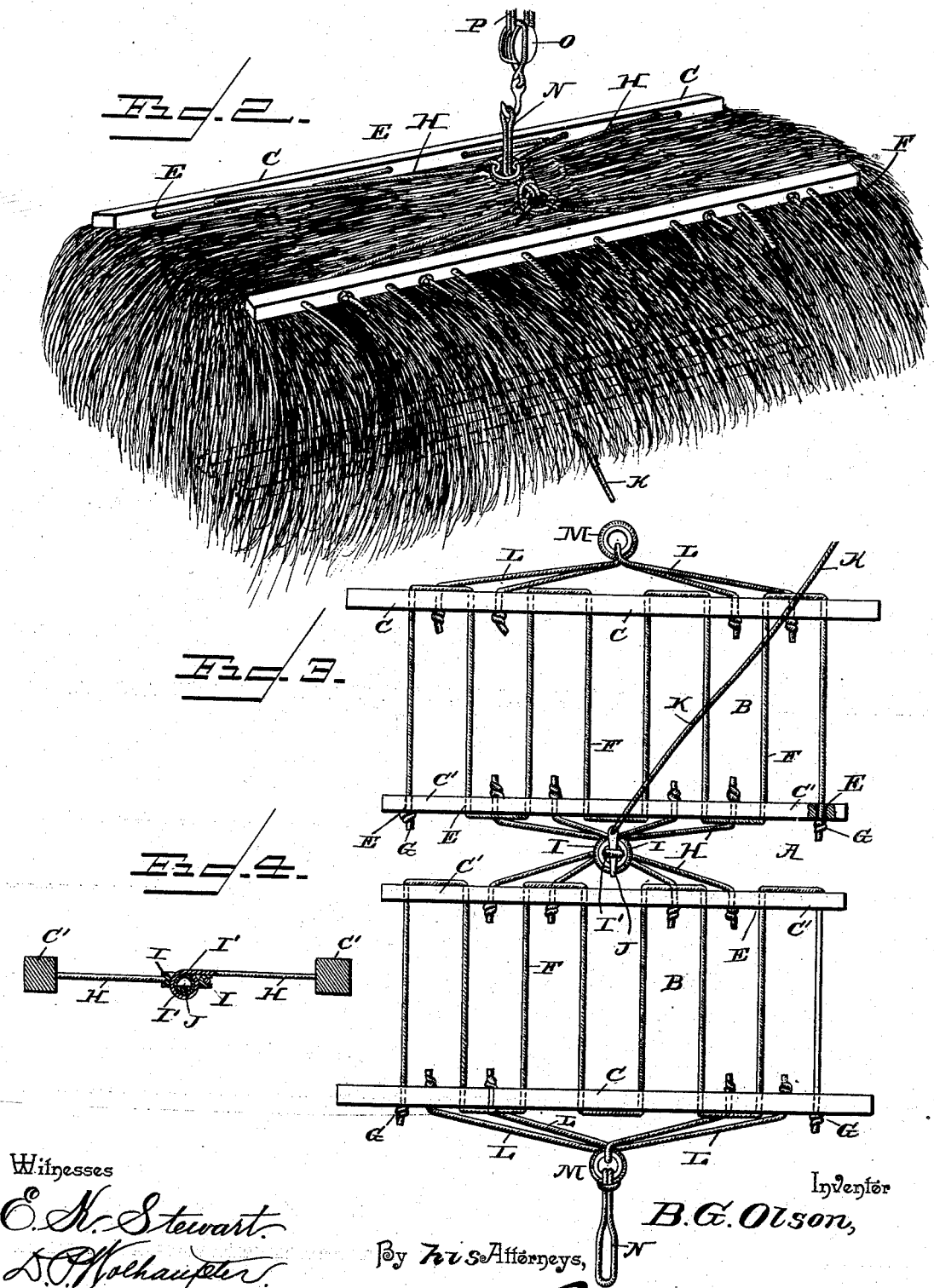

United States Patent Office.

BERNARD G. OLSON, OF CHINOOK, MONTANA.

HAY-SLING.

SPECIFICATION forming part of Letters Patent No. 505,227, dated September 19, 1893.

Application filed December 17, 1892. Serial No. 455,430. (No model.)

*To all whom it may concern:*

Be it known that I, BERNARD G. OLSON, a citizen of the United States, residing at Chinook, in the county of Choteau and State of Montana, have invented a new and useful Hay Net or Sling, of which the following is a specification.

This invention relates to hay nets; and it has for its object to provide certain improvements in hay nets or slings for elevating hay, straw and other loose material.

The invention contemplates a net or sling which shall provide means for unloading a rack at one single elevation or operation, and confining the load until the material has been carried or elevated to the rick or barn loft by the ordinary elevating tackle, and there tripped.

The primary object of the improvement is to more effectually secure and facilitate the elevating of whole loads of hay at one elevation, in such a manner as not to allow the bundle to stretch or lengthen during its elevation beyond its original depth and to expedite the discharge of the load.

With these and many other objects in view which will readily appear as the nature of the invention is better understood, the same consists in the novel construction, combination and arrangement of parts hereinafter more fully described, illustrated and claimed.

In the accompanying drawings:—Figure 1 is a perspective view of the body of a hay rack having a hay net or sling therein and constructed in accordance with this invention. Fig. 2 is a perspective view illustrating a load of hay being elevated in my improved net. Fig. 3 is a detail plan view of the hay net or sling complete. Fig. 4 is a detail in section of the tripping device. Fig. 5 is a plan view of a modification of the net or sling.

Referring to the accompanying drawings, A represents a hay net or sling comprising the opposite sections B, which are duplicate constructions of each other, and are designed to confine the hay therebetween and hold it during elevation until the dumping point is reached. Each section B, of the hay net or sling comprises the separated parallel net bars C and C', respectively, the bars C, of each net section being longer than the bars C'; so that the projecting ends of such long bars can rest on the opposite ends of a hay rack D, as illustrated in Fig. 1, and as hereinafter more fully explained.

The bars C, and C', of the net sections are provided with the perforations E, extending from end to end thereof and through which perforations are laced the single binding or net ropes F. The binding ropes F, of each net section are sufficiently long, so that the same can be laced transversely and alternately from bar to bar of each net section from end to end thereof, so that the bars C, can rest on the top ends of the hay rack while the other bars C', can rest on the bottom of the rack, as illustrated, the rope being sufficiently slack to allow the full load of hay to be placed in the rack. Both ends of the laced binding rope F, of each new section are knotted at one side of one of the bars as at G, and this knotting of the ends of the binding ropes provides means for the adjustment of the section bars C and C', to and from each other, according to the depth of the hay rack in which it is used, or according to the width of the hay rack if it happens to a flat hay rack. This adjustment will be apparent. To the shorter lower bars C', of each net section is secured a series of converging equalizing connecting ropes H, which are secured at one end to different points on said bars so as to equalize the strain thereon, and converge at their other ends to the center of the bar and are connected at such point to the tripping connecting loops or eyes I and I', respectively. The loop or eye I, of one net section is larger than the loop I', of the other net section, so that the latter loop can be passed through the former and held therein by means of the tapered trip pin J, adapted to be inserted in the smaller loop and have connected to one end thereof the trip rope K, which when pulled by the operator after the hay has been carried to its point of dump, releases the small loop from the larger loop, and thereby disconnects the connected lower ends of the hay net or sling, to discharge the load. To the longer upper net bars C of each section are secured a series of converging equalizing attaching ropes L, which are also secured at one end to different points on the bars to equalize the strain thereon, and converge to the center of the bar at which point they are connected to the loops or eyes M, to one of which is secured one end of the binding strap rope N. The strap rope N, is necessarily somewhat longer than the width of the rack on which the net is used, and the free end thereof is designed to be passed transversely across the top of the load of hay, through the loop M, on the attaching ropes of the opposite net section and connected to the block O, of the ordinary elevating and carrying devices as clearly illustrated in Fig. 2.

In operation, when the net herein described is used on hay racks having sides, the short bars C', of each section are coupled together by the trip pin, and lay longitudinally on the bottom of the rack, while the upper longer net bars C, have their ends rest on the top ends of the rack, and the entire load of hay is then placed in the rack and on top of the hay net therein. When ready to unload the hay from the rack, the strap rope N, is passed transversely across the hay and looped through the loop M, of the net section opposite to that to which the strap rope is connected, and the free end of said rope is then attached to the block at one end of the ordinary draft rope P. As the draft rope P, pulls up, the strap rope N, draws the long bars of the net section toward each other so as to bind the load sufficiently tight within the net to allow it to come out of the rack freely. The unyielding connected bottom bars C', keep the load from sagging or stretching while it is being elevated, it being understood that the less the load sags the greater the height the ricks can be built with the same size derrick, which is an important point. When the load has been carried to the top of the rick or mow, by pulling the free trip rope K, the bottom bars C', of the net sections are disconnected to allow the load to be released from the net. At this point it may be well to note that the strap rope N, together with the equalizing ropes are quite important to the efficient operation of the net. As before stated, after the strap rope has been passed through the loop M, the draft rope P, is attached thereto, so that as the draft is applied, the opposite net sections are drawn toward each other and reduce the size of the load so that the same can be easily lifted from the rack, and it will also be apparent that if drawn sufficiently, the strap rope will draw the net sections so that the taut equalizing ropes will meet, and the loop to which the strap rope is attached will be drawn under the corresponding loop of the opposite section. This allows the draft rope to be hooked onto the underlapping equalizing rope loop, should it be desired to elevate the load to the greatest height of the derrick, or to permit the load to pass through a small door or opening.

The net herein described can also be used on flat hay racks, and in the event of such use the same can be slightly modified as illustrated in Fig. 5 wherein the net bars are of the same length and are adapted to have connected to suitable attaching loops Q, connected to the top bars thereof, the draft hitching ropes R, which are adapted to hang over the sides of the wagon and be brought together over the top of the load and connected to the draft rope block.

Changes in the form, proportion and the minor details of construction may be resorted to without departing from the principle or sacrificing any of the advantages of this invention.

Having thus described my invention, what I claim, and desire to secure by Letters Patent, is—

The combination in a hay net of the separate duplicate sections comprising flexibly and adjustably connected net bars the outer bars of each section being longer than the other inner bars and adapted to have their projecting ends rest on the top ends of a hay rack to support the net open within said rack, equalizing connecting ropes secured to the outer bars and converging to central connecting loops or eyes, one of which is smaller than the other and is adapted to be passed therethrough, a tapered trip pin adapted to be inserted in the smaller loop at one side of the larger loop to connect the same, a trip rope connected to said pin, equalizing attaching ropes secured to the outer bars and having central loops, and a strap rope secured at one end to one of said loops and adapted to be looped across a bundle and through the opposite loop, substantially as set forth.

In testimony that I claim the foregoing as my own I have hereto affixed my signature in the presence of two witnesses.

BERNARD G. OLSON.

Witnesses:
L. V. BOGY,
THOS. O'HANLON.